United States Patent
Takahashi et al.

(10) Patent No.: US 10,065,152 B2
(45) Date of Patent: Sep. 4, 2018

(54) SEAWATER DESALINATION SYSTEM AND ENERGY RECOVERY APPARATUS

(71) Applicant: EBARA CORPORATION, Tokyo (JP)

(72) Inventors: Tamami Takahashi, Tokyo (JP); Masanori Goto, Tokyo (JP); Kazuaki Maeda, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 196 days.

(21) Appl. No.: 14/781,375

(22) PCT Filed: Mar. 28, 2014

(86) PCT No.: PCT/JP2014/059316
§ 371 (c)(1),
(2) Date: Sep. 30, 2015

(87) PCT Pub. No.: WO2014/163019
PCT Pub. Date: Oct. 9, 2014

(65) Prior Publication Data
US 2016/0051933 A1  Feb. 25, 2016

(30) Foreign Application Priority Data

Apr. 5, 2013  (JP) .................................. 2013-079901

(51) Int. Cl.
*B01D 61/02*  (2006.01)
*B01D 61/06*  (2006.01)
(Continued)

(52) U.S. Cl.
CPC ............ *B01D 61/06* (2013.01); *B01D 61/025* (2013.01); *C02F 1/441* (2013.01); *F15D 1/025* (2013.01);
(Continued)

(58) Field of Classification Search
CPC ........ B01D 61/06; B01D 61/025; B01D 61/10; B01D 2313/08; B01D 2313/246;
(Continued)

(56) References Cited

U.S. PATENT DOCUMENTS 5,341,848 A * 8/1994 Laws ..................... F15D 1/025
138/40
7,051,765 B1 * 5/2006 Kelley ..................... F15D 1/02
138/40

(Continued)

FOREIGN PATENT DOCUMENTS

JP    S49-23805     6/1974
JP    53-124178 A  10/1978
(Continued)

OTHER PUBLICATIONS

International Search Report for Application No. PCT/JP2014/059316 dated May 13, 2014.

*Primary Examiner* — David C Mellon
*Assistant Examiner* — Benjamin L Lebron
(74) *Attorney, Agent, or Firm* — Pearne & Gordon LLP

(57) ABSTRACT

An energy recovery apparatus used in the seawater desalination system includes a cylindrical chamber (CH) having a space for containing concentrated seawater and seawater therein and being installed such that a longitudinal direction of the chamber is placed in a vertical direction, a concentrated seawater port (P1) provided at the lower part of the chamber (CH) for supplying and discharging the concentrated seawater, a seawater port (P2) provided at the upper part of the chamber (CH) for supplying and discharging the seawater, a flow resistor (23) provided at a concentrated seawater port side in the chamber, and a flow resistor (23) provided at a seawater port side in the chamber. A circular plate (30) having a hole at the center thereof is provided (Continued)

between the concentrated seawater port (P1) and the flow resistor (23), or between the seawater port (P2) and the flow resistor (23).

8 Claims, 15 Drawing Sheets

(51) Int. Cl.
*C02F 1/44* (2006.01)
*F15D 1/02* (2006.01)
*G01F 1/42* (2006.01)
*B01D 61/10* (2006.01)
*C02F 103/08* (2006.01)

(52) U.S. Cl.
CPC ............... *G01F 1/42* (2013.01); *B01D 61/10* (2013.01); *B01D 2313/08* (2013.01); *B01D 2313/246* (2013.01); *C02F 2103/08* (2013.01); *C02F 2303/10* (2013.01); *Y02A 20/131* (2018.01); *Y02W 10/30* (2015.05)

(58) Field of Classification Search
CPC .. B01D 2313/18; C02F 1/441; C02F 2103/08; C02F 2303/10; C02F 2303/18; F15B 21/14; F04F 13/00; F15D 1/00; F15D 1/0005; F15D 1/02; F15D 1/08; F15D 1/025; F16L 55/02718; G01F 1/42; B01F 5/0682; B01F 5/0688; E03C 1/02; E03C 1/08; E03C 1/084; B05B 1/3415; Y02A 20/131; Y02W 10/30
See application file for complete search history.

(56) References Cited

U.S. PATENT DOCUMENTS

| | | | |
|---|---|---|---|
| 2006/0231149 A1* | 10/2006 | Kulkarni | G01F 1/42 |
| | | | 138/44 |
| 2011/0089093 A1* | 4/2011 | Myran | B01D 61/06 |
| | | | 210/137 |
| 2012/0061309 A1* | 3/2012 | Takahashi | B01D 61/025 |
| | | | 210/251 |

FOREIGN PATENT DOCUMENTS

| | | |
|---|---|---|
| JP | 2011-069329 A | 4/2011 |
| JP | 2012-096151 A | 5/2012 |
| JP | 2012-166184 A | 9/2012 |
| JP | 2012-206019 A | 10/2012 |
| JP | 2012-232291 A | 11/2012 |
| WO | 2011/045628 A1 | 4/2011 |

* cited by examiner

SEAWATER DESALINATION SYSTEM AND ENERGY RECOVERY APPARATUS

TECHNICAL FIELD

The present invention relates to a seawater desalination system for desalinating seawater by removing salinity from the seawater and an energy recovery apparatus which is preferably used in the seawater desalination system.

BACKGROUND ART

Conventionally, as a system for desalinating seawater, there has been known a seawater desalination system in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the osmotic pressure and is desalinated, and fresh water (permeate or desalted water) is taken out from the reverse-osmosis membrane-separation apparatus. The remaining seawater is discharged in a concentrated state of a high salt content as a concentrated seawater (brine) from the reverse-osmosis membrane-separation apparatus. The largest operational cost in the seawater desalination system is energy cost, and it depends heavily on energy for pressurizing the pretreated seawater up to such a pressure to overcome the osmotic pressure, i.e. up to the reverse-osmosis pressure. That is, the operational cost of the seawater desalination system is greatly affected by pressurizing energy of the seawater by the high-pressure pump.

Specifically, more than half of the electric expenses as the highest cost in the seawater desalination system are consumed to operate the high-pressure pump for pressurizing the seawater. Therefore, pressure energy possessed by the high-pressure concentrated seawater (reject) with the high salt content which has been discharged from the reverse-osmosis membrane-separation apparatus is utilized for pressurizing part of the seawater. Therefore, as a means for utilizing the pressure energy of the concentrated seawater discharged from the reverse-osmosis membrane-separation apparatus to pressurize part of the seawater, there has been utilized an energy recovery chamber in which an interior of a cylinder is separated into two spaces by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 16 is a schematic view showing a configuration example of a conventional seawater desalination system. As shown in FIG. 16, seawater pumped into the seawater desalination system by an intake pump (not shown) is processed to have certain water qualities by a pretreatment system for removing suspended matter or the like, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy recovery chamber 10. A seawater supply line 1 for supplying the pretreated seawater having a low pressure is branched at an upstream side of the high-pressure pump 2 and is connected via a valve 7 to a seawater port P2 of the energy recovery chamber 10. The energy recovery chamber 10 has a piston 16 therein, and the piston 16 is arranged to be movable in the energy recovery chamber 10 while separating the interior of the energy recovery chamber 10 into two volume chambers.

The seawater pressurized by utilizing a pressure of the concentrated seawater in the energy recovery chamber 10 is supplied via the valve 7 to a booster pump 8. The control valve 6, the valve 7 and the energy recovery chamber 10 constitute an energy recovery apparatus 11. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4.

FIG. 17 is a schematic view showing a configuration example of the conventional seawater desalination system comprising the two control valves 6, the two energy recovery chambers 10 and the two valves 7 which are the components of the energy recovery apparatus shown in FIG. 16. As shown in FIG. 17, since the energy recovery apparatus 11 has the two energy recovery chambers 10, 10, the energy recovery apparatus 11 is operated such that while the concentrated seawater is supplied to one of the two energy recovery chambers 10, 10, the concentrated seawater is discharged from the other of the energy recovery chambers. Therefore, since the high-pressure seawater can be discharged at all times (continuously) from the apparatus by alternating suction of the low-pressure seawater and discharge of the high-pressure seawater, the flow rate of the seawater supplied to the reverse-osmosis membrane separation apparatus 4 can be kept constant and the fresh water can be obtained at a constant flow rate from the reverse-osmosis membrane separation apparatus 4.

In the above-described conventional energy recovery chamber, the piston in the energy recovery chamber is brought into sliding contact with the inner wall of the chamber, and thus the sliding member of the piston is required to be periodically replaced due to wear of the sliding member. Further, the inner diameter of the long chamber is required to be machined with high accuracy so as to fit with the outer shape of the piston, and thus machining cost is very expensive.

Therefore, the applicants of the present invention have proposed an energy recovery chamber having no piston in Japanese-laid open patent publication No. 2012-232291 by employing the system for pressurizing the seawater directly with the concentrated seawater by introducing the seawater and the high-pressure concentrated seawater discharged from the reverse-osmosis membrane (RO membrane) into a cylindrical and elongated chamber, which is used as an energy exchange chamber.

FIG. 18 is a cross-sectional view showing an energy recovery chamber 10 having no piston. As shown in FIG. 18, the energy recovery chamber 10 comprises a long chamber body 11 having a cylindrical shape, and end plates 12 for closing both opening ends of the chamber body 11. A chamber CH is formed in the chamber body 11, and a concentrated seawater port P1 is formed in one of the end plates 12 and a seawater port P2 is formed in the other of the end plates 12. The concentrated seawater port P1 and the seawater port P2 are disposed on the central axis of the cylindrical chamber body 11. The inner diameter of the chamber CH is set to $\phi D$, and the inner diameter of the concentrated seawater port P1 and the seawater port P2 is set to $\phi d$.

The energy recovery chamber 10 is installed vertically. The chamber CH is disposed vertically in consideration of the effect of a difference in specific gravity between the concentrate seawater and the seawater, and the port P1 for the concentrated seawater having large specific gravity is disposed at a lower part of the chamber CH and the port P2 for the seawater having small specific gravity is disposed at an upper part of the chamber CH. Specifically, the long chamber body 11 having a cylindrical shape is disposed such that a longitudinal direction (axial direction) of the chamber is placed in a vertical direction. The concentrated seawater port P1 is provided at the lower part of the chamber CH so as to supply and discharge the concentrated seawater at the lower part of the chamber CH, and the seawater port P2 is provided at the upper part of the chamber CH so as to supply and discharge the seawater at the upper part of the chamber CH. The entire length of the chamber CH is L. In the chamber CH, a flow resistor 13 is disposed at a position spaced by a distance L1 in the axial direction from the concentrated seawater port P1, and a flow resistor 13 is disposed at a position spaced by a distance L1 in the axial direction from the seawater port P2. The flow resistor 13 comprises a single perforated plate.

In the energy recovery chamber 10 shown in FIG. 18, a fluid flows in from the respective ports P1, P2 having a small diameter, and the fluid flow having a large velocity distribution at a central part of the chamber is dispersed in a diametrical direction of the chamber CH by the flow resistor 13 and is regulated to form a uniform flow in cross-section of the chamber. Therefore, two fluids are pushed and pulled in such a state that the interface between the seawater and the concentrated seawater is maintained horizontally, and thus the energy transmission is performed while maintaining the state in which the seawater and the concentrated seawater having different salt concentrations are less likely to be mixed in the chamber.

FIG. 19 is a cross-sectional view showing the energy recovery chamber 10 in which two perforated plates spaced by a predetermined distance are disposed near the respective ports as a flow resistor disposed near each port in FIG. 18. As shown in FIG. 19, in the chamber CH, a first perforated plate 14 is provided at a position spaced by a distance L1 in the axial direction from the concentrated seawater port P1, and a second perforated plate 15 is provided at a position spaced by a distance L2 in the axial direction from the first perforated plate 14. Similarly, a first perforated plate 14 is provided at a position spaced by a distance L1 in the axial direction from the seawater port P2, and a second perforated plate 15 is provided at a position spaced by a distance L2 in the axial direction from the first perforated plate 14. The two perforated plates 14 and 15 constitute a flow resistor 13.

Other structural elements of the energy recovery chamber 10 shown in FIG. 19 are the same as those in the energy recovery chamber 10 shown in FIG. 18.

CITATION LIST

Patent Literature

Patent document 1: Japanese laid-open patent publication No. 2012-232291

SUMMARY OF INVENTION

Technical Problem

In the energy recovery chamber 10 shown in FIG. 19, when the fluid flows into the chamber CH from the respective ports P1, P2 having a small diameter, the fluid flow which has a velocity distribution having a high velocity at a central part of the chamber CH is formed, and the fluid flow having a velocity difference in the cross-section of the chamber is dispersed so as to spread across the outer circumference of the chamber by the first perforated plate 14. Further, the fluid flows in the chamber by the interval L2, and then the fluid is dispersed and regulated by the second perforated plate 15 so as to become a uniform flow in the cross-section of the chamber.

Here, a uniform flow of fluid means that velocities and directions of fluid flow are uniform in a certain horizontal cross-section of the chamber. Specifically, the case where flow velocity of fluid (scalar) and flow direction of fluid (vector) in a certain horizontal cross-section of the chamber are identically distributed at any position in the horizontal cross-section is defined as a completely uniform flow of fluid. Specifically, as shown in FIG. 20, flows at arbitrary points Pn, Pm in the horizontal cross-section are shown by arrows representing flow magnitudes which are Vn, Vm, respectively. In this case, when angles ($\alpha$, $\beta$) between the arrows and the auxiliary lines X, Y (X is perpendicular to Y) on the horizontal cross-section are the same ($\alpha_n = \alpha_m$, $\beta_n = \beta_m$), the flows at the points Pn, Pm are defined as a uniform flow. When the angles $\alpha$, $\beta$ are the same at any position in the horizontal cross-section, such flow is defined as a completely uniform flow of fluid. Here, the condition of being closer to this state is defined as a uniform flow. Because a cylindrical chamber wall exists at the outer circumference in the horizontal cross-section as a vertical wall surface, as both the angles $\alpha$, $\beta$ become closer to a right angle, more uniform flow is formed.

When the fluid flows into the chamber CH from the respective ports P1, P2 having a small diameter, the fluid flows through the central part at a high speed and through the outer circumferential part at a low speed in the horizontal cross-section of the chamber in the vicinity of the respective ports P1, P2. Here, to make the dispersion of velocity distribution in the horizontal cross-section small by averaging the fluid flow so that the fluid flows through the central part at a low speed and through the outer circumferential part at a high speed is defined as "an uniformizing action" "for uniformizing the flow". Further, "regulating the flow" means that distribution of flow velocity is changed, and to form a uniform flow as a result of changing the distribution of flow velocity by regulating the flow is defined as "uniformization of flow by regulating the flow".

The pushing and pulling of the seawater and the concentrated seawater means the operation for pushing out (pushing) the seawater from the chamber while pressurizing the seawater with the concentrated seawater, and then drawing in and discharging (pulling) the concentrated seawater with the seawater by switching the valve 6. In FIGS. 18 and 19, a boundary portion of the two fluid where the seawater and the concentrated seawater are brought into contact with each other is formed in the chamber space having a length La between the flow resistors 13, 13. The boundary portion reciprocates in La by pushing and pulling of the seawater and the concentrated seawater, and thus the seawater and the concentrated seawater are controlled so that the seawater is not discharged from the concentrated seawater port P1 and the concentrated seawater is not discharged from the seawater port P2. In the case where the chamber is installed vertically, i.e., is configured such that the concentrated seawater is located at the lower part of the chamber and the seawater is located at the upper part of the chamber, the pushing and pulling of the seawater and the concentrated seawater have the same meaning as the pushing up the seawater and pushing down the concentrated seawater.

The mixing of the seawater and the concentrated seawater at the boundary portion is accelerated by pushing and pulling of the seawater and the concentrated seawater. However, by allowing the flow of the seawater and the concentrated seawater above and below the boundary portion to be a uniform flow in the zone of La in the chamber, the phenomenon in which the boundary surface causes turbulence flow diffusion by non-uniformity of the flow to mix the seawater and the concentrated seawater is suppressed. At the same time, by maintaining the boundary portion horizontally, the pushing and pulling of the seawater and the concentrated seawater can be performed as if there is a hypothetical piston.

In the conventional energy recovery chamber, as shown in FIGS. 18 and 19, the centers of the concentrated seawater port P1 and the seawater port P2 are in alignment respectively with the axis of the chamber CH, and the concentrated seawater port P1 is directed vertically upward as an inflow direction of fluid and the seawater port P2 is directed vertically downward as an inflow direction of fluid.

However, in the actual apparatus, the position of the port is required to be changed from the restrictions of the height or the arrangement of the apparatus. Therefore, as shown in FIG. 21, supply of the seawater and discharge of the seawater are performed as individual ports, i.e., a seawater inflow port $P2_{IN}$ and a seawater discharge port $P2_{OUT}$ which are arranged at positions spaced radially from the center of the chamber. However, mixing of the seawater and the concentrated seawater in the chamber occurs at a rate much larger than expected.

Specifically, the applicants of the present invention have performed analysis by analysis model in which the position of the port is spaced from the center of the chamber as shown in FIG. 21, and found that when supply and discharge of fluid is performed from the eccentric port, the flow of fluid does not become uniform in the cross-section of the chamber and the velocity distribution of fluid becomes non-uniform.

FIG. 22 is a view showing the results of flow analysis in the case where the seawater port is arranged at a position spaced in a radial direction from the chamber axis and the seawater flows into the chamber from the seawater inflow port $P2_{IN}$. In FIG. 22, the seawater discharge port $P2_{OUT}$ is not shown. Arrows in FIG. 22 are as follows: Flow velocity of fluid is shown by a length of arrow and flow direction of fluid is shown by a direction of arrow. The fluid which flows into the chamber CH from the seawater inflow port $P2_{IN}$ flows in a state of high flow velocity in the vicinity of the port so as to collide with the first perforated plate 14, and the flow of fluid which passes through the first perforated plate 14 is formed, and simultaneously, the flow of fluid which cannot pass through the first perforated plate 14 and is directed horizontally from the left side where the port is disposed to the right side along the first perforated plate 14 toward the chamber side surface side is formed. Then, the flow of fluid which passes through the first perforated plate 14 at the chamber side surface side on the right side of the chamber is formed, and thus the flow of fluid becomes such that the flow of fluid is separated into two in the space between the first perforated plate 14 and the second perforated plate 15. Then, at the downstream of the second perforated plate 15, the velocity distribution at a position closer to the chamber inner wall side is high and the velocity distribution at the central part of the chamber is low, and thus non-uniform flow of fluid in the plane is formed in the A-A cross-section spaced by a predetermined distance from the second perforated plate 15.

When the flow in this state is formed, the concentrated seawater remains much at the central part of the chamber where the velocity distribution is low, and thus the concentrated seawater at the central part of the chamber is discharged from the chamber when the seawater is discharged from the chamber. As a result, the seawater with a high salt content is discharged.

The present invention has been made in view of the above drawbacks. It is therefore an object of the present invention to provide an energy recovery apparatus, having flow resistors disposed respectively at the concentrated seawater port side and the seawater port side of the chamber, which can perform pressure transmission from the high-pressure concentrated seawater to the seawater while suppressing mixing of the two fluids at the boundary portion where the two fluids are brought into contact with each other by the flow-regulating effect for uniformizing the flow of fluid by the flow resistors even if the concentrated seawater port and/or the seawater port are not disposed on the central axis of the chamber.

Solution to Problem

In order to achieve the above object, according to one aspect of the present invention, there is provided an energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising: a cylindrical chamber having a space for containing concentrated seawater and seawater therein, the chamber being installed such that a longitudinal direction of the chamber is placed in a vertical direction; a concentrated seawater port provided at a lower part of the chamber for supplying and discharging the concentrated seawater; a seawater port provided at an upper part of the chamber for supplying and discharging the seawater; a flow resistor provided at a concentrated seawater port side in the chamber; and a flow resistor provided at a seawater port side in the chamber; wherein a circular plate having a hole at the center thereof is provided between the concentrated seawater port and the flow resistor, or between the seawater port and the flow resistor.

According to the present invention, the concentrated seawater is supplied to and discharged from the chamber through the concentrated seawater port provided at the lower part of the chamber, and the seawater is supplied to and discharged from the chamber through the seawater port provided at the upper part of the chamber. In this case, even if the seawater port and the concentrated seawater port are not located on the chamber axis, the fluid which has flowed in the chamber flows through the hole at the central portion of the circular plate toward the central portion of the flow resistor. Therefore, the flow of fluid is dispersed over the entirety of the chamber from the central portion at the upstream side of the flow resistor without the deviated flow, and thus the flow of fluid at the downstream side of the flow resistor can be regulated more uniformly. The concentrated seawater and the seawater which are regulated by the flow resistors form a boundary portion by a difference in specific gravity, and the concentrated seawater pushes up the seawater. Thus, while the concentrated seawater and the seawater are separated one above the other and mixing of the concentrated seawater and the seawater at the boundary portion where the two fluids are brought into contact with each other is suppressed, the pressure can be transmitted from the high-pressure concentrated seawater to the seawater.

According to a preferred aspect of the present invention, the flow resistors provided at the concentrated seawater port side and the seawater port side comprise at least one perforated plate or at least one mesh plate formed by weaving a wire material.

According to the present invention, the flow resistor comprises at least one perforated plate or mesh plate, and suitable flow resistance is applied to the flow at the upstream side of the perforated plate or the mesh plate in the chamber. Therefore, the flow of fluid can be regulated so that the flow at the downstream side of the perforated plate or the mesh plate becomes uniform over the entirety of the chamber.

According to a preferred aspect of the present invention, the flow resistors provided at each of the concentrated seawater port side and the seawater port side are two perforated plates or mesh plates disposed so as to be spaced from each other, and comprise a first perforated plate or a first mesh plate and a second perforated plate or a second mesh plate which is placed more distant from the port side than the first perforated plate or the first mesh plate.

According to the present invention, as the flow resistor, the arrangement positions of the first perforated plate (first mesh plate) and the second perforated plate (second mesh plate), the diameter of the small hole, the distance of the small holes (pitch), and the aperture ratio can be adjusted. Therefore, the degree of freedom for adjusting the uniformizing action of the flow increases, and the uniformizing action can be enhanced.

According to a preferred aspect of the present invention, at least one of the concentrated seawater port and the seawater port is spaced radially from an axis of the cylindrical chamber.

According to the present invention, since at least one of the concentrated seawater port and the seawater port is spaced radially from the axis of the cylindrical chamber, without limitations of height or arrangement of the apparatus or without limitations of design, the apparatus can be constructed such that attachment positions and directions of the concentrated seawater port and the seawater port are arranged at arbitrary positions.

According to a preferred aspect of the present invention, the area of the hole of the circular plate having the hole at the center thereof is equal to or larger than the smaller one of the area of the concentrated seawater port and the area of the seawater port.

According to the present invention, the area of the hole of the circular plate having the hole at the central part thereof is equal to or larger than the smaller one of the area of the concentrated seawater port and the area of the seawater port. Therefore, the flow velocity of fluid which passes through the hole of the circular plate having the hole at the central part thereof can be made to be lower than the flow velocity of fluid which flows in from the concentrated seawater port or the seawater port, and thus the velocity difference of fluid in the cross-section of the chamber can be small at the subsequent flow resistor. Consequently, the uniformizing action of flow by the flow resistor can be enhanced.

According to a preferred aspect of the present invention, the circular plate has a plurality of holes around the hole at the center thereof.

According to the present invention, by the small holes provided at the circumferential portion of the circular plate, while the fluid which passes through the circular plate flows through the central hole substantially, a trickle of fluid through the outer circumferential side is formed, and thus the flow of fluid to the flow resistor can be more uniformized. Further, by providing the small-diameter holes at the circumferential portion of the circular plate, a force applied to the circular plate by a pressure difference between upstream and downstream of the circular plate can be small, and thus deformation of the plate caused by the flow can be lessened.

According to a preferred aspect of the present invention, at least one of the concentrated seawater port and the seawater port is provided in an end plate for closing opening end of the cylindrical chamber or provided in a cylindrical outer surface of the chamber.

According to the present invention, since at least one of the concentrated seawater port and the seawater port is provided in an end plate for closing an opening end of the cylindrical chamber or provided in a cylindrical outer surface of the chamber, without limitations of height or arrangement of the apparatus or without limitations of design, the apparatus can be constructed such that attachment positions and directions of the concentrated seawater port and the seawater port are arranged at arbitrary positions.

According to a preferred aspect of the present invention, at least one of the concentrated seawater port and the seawater port comprises a port for water supply and a port for water discharge.

According to the present invention, since at least one of the concentrated seawater port and the seawater port comprises a port for water supply and a port for water discharge, supply and discharge of the concentrated seawater or the seawater can be performed individually as the concentrated seawater port or the seawater port, and thus the degree of freedom in design of the port arrangement can be increased.

According to a second aspect of the present invention, there is provided a seawater desalination system for producing fresh water from seawater by supplying the seawater pressurized by a pump to a reverse-osmosis membrane-separation apparatus to separate the seawater into fresh water and concentrated seawater, the seawater desalination system comprising: an energy recovery apparatus according to any one of claims 1 to 8 for converting pressure energy of the concentrated seawater discharged from the reverse-osmosis membrane-separation apparatus to pressure energy of the seawater.

According to the present invention, the pressure energy of the high-pressure concentrated seawater discharged from the reverse-osmosis membrane-separation apparatus can be directly transmitted to the seawater, and mixing of the two fluids when the concentrated seawater and the seawater are pushed and pulled can be suppressed. Therefore, the seawater having a high salt content is not discharged from the energy recovery apparatus, and thus the system can be operated without raising supply pressure of the seawater to the reverse-osmosis membrane-separation apparatus. Accordingly, the electric power required for operating the system can be reduced.

Advantageous Effects of Invention

According to the present invention, the following effects can be achieved.

1) Even if the concentrated seawater port and/or the seawater port are not located on the central axis of the chamber, the fluid which has flowed in from the port flows toward the central part of the flow resistor by the circular plate having the hole at the central part thereof, and by the flow-regulating effect for uniformizing the flow of fluid by the flow resistor, while the mixing of the concentrated seawater and the seawater at the boundary portion where the two fluids are brought into contact with each other is suppressed, the pressure can be transmitted from the high-pressure concentrated seawater to the seawater.

2) Because mixing of the concentrated seawater and the seawater in the chamber due to turbulent flow diffusion can be suppressed and the seawater having a high salt content is not delivered to the reverse-osmosis membrane-separation apparatus, the reverse-osmosis membrane-separation apparatus can provide its sufficient performance and the replacement cycle of the reverse-osmosis membrane itself can be prolonged.

DESCRIPTION OF EMBODIMENTS

Figure 1:
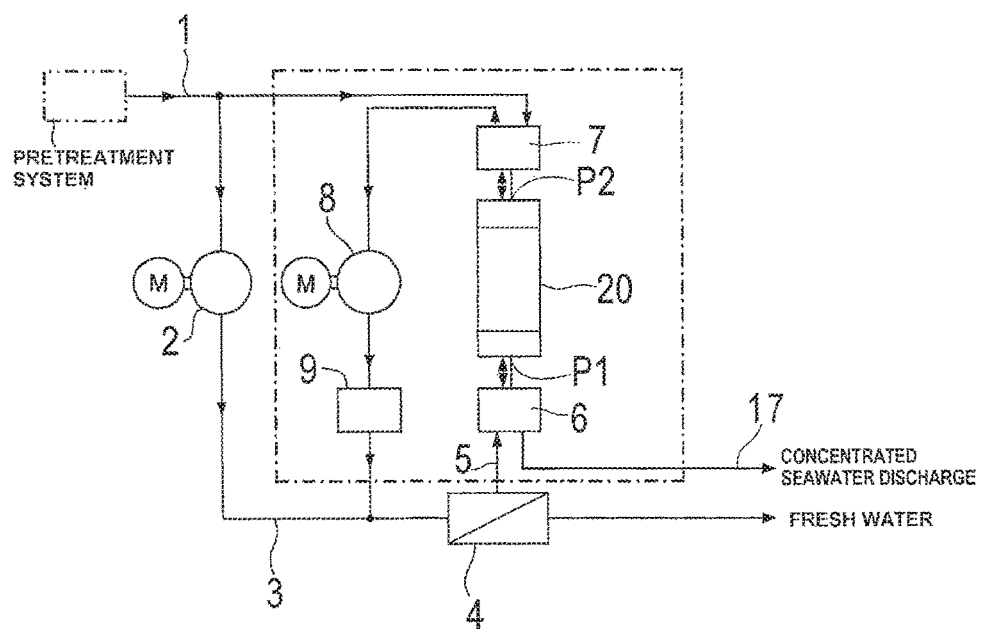
FIG. 1 is a schematic view showing a configuration example of a seawater desalination system according to the present invention.

An energy recovery apparatus according to preferred embodiments of the present invention will be described below with reference to FIGS. 1 through 15. Identical or corresponding parts are denoted by identical reference numerals in FIGS. 1 through 15 and will not be described in duplication.

FIG. 1 is a schematic view showing a configuration example of a seawater desalination system according to the present invention. As shown in FIG. 1, seawater pumped into the seawater desalination system by an intake pump (not shown) is processed to have certain water qualities by a pretreatment system, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy recovery chamber 20. A seawater supply line 1 for supplying the pretreated seawater having a low pressure is branched at an upstream side of the high-pressure pump 2 and is connected via a valve 7 to a seawater port P2 of the energy recovery chamber 20. The energy recovery chamber 20 performs energy transmission from the concentrated seawater to the seawater while separating two fluids by a boundary region between the concentrated seawater and the seawater.

The seawater pressurized by utilizing a pressure of the concentrated seawater in the energy recovery chamber 20 is supplied via a valve 7 to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4. On the other hand, the concentrated seawater which has pressurized the seawater and lost the energy is discharged from the energy recovery chamber 20 via the control valve 6 to a concentrated seawater discharge line 17.

When the pressure of the discharge line 3 of the high-pressure pump 2 is 6.5 MPA for example, the pressure is slightly lowered by pressure loss of the RO membrane module of the reverse-osmosis membrane-separation apparatus 4, and the concentrated seawater having a pressure of 6.4 MPA is discharged from the reverse-osmosis membrane-separation apparatus 4. When the pressure energy of the concentrated seawater acts on the seawater, the seawater is pressurized to the same pressure (6.4 MPA), but the pressure is decreased by pressure loss of the energy recovery apparatus itself when the seawater flows through the energy recovery apparatus, and the seawater having a pressure of 6.3 MPA for example is discharged from the energy recovery apparatus. The booster pump 8 slightly pressurizes the seawater from 6.3 MPA to 6.5 MPA, and the seawater merges into the discharge line 3 of the high-pressure pump 2 and is supplied to the reverse-osmosis membrane-separation apparatus 4. The booster pump 8 only needs to pressurize the seawater to make up for such a small pressure loss, and thus a small amount of energy is consumed in the booster pump 8.

It is assumed that 100% of an amount of seawater is supplied to the reverse-osmosis membrane-separation apparatus 4, 40% of the amount of the seawater can be changed to fresh water. The remaining 60% of the amount of the seawater is concentrated and discharged from the reverse-osmosis membrane-separation apparatus 4 as concentrated seawater. Then, the pressure of the 60% concentrated seawater is transmitted and recovered by the seawater in the energy recovery apparatus, and the seawater having an increased pressure is discharged from the energy recovery apparatus. Therefore, the seawater having a high pressure equivalent to the seawater pressurized by the high-pressure pump can be obtained, with a small amount of energy consumed by the booster pump. Thus, the energy which is consumed by the high-pressure pump to produce the fresh water can be about half of the energy in the case of no energy recovery apparatus.

Figure 2:
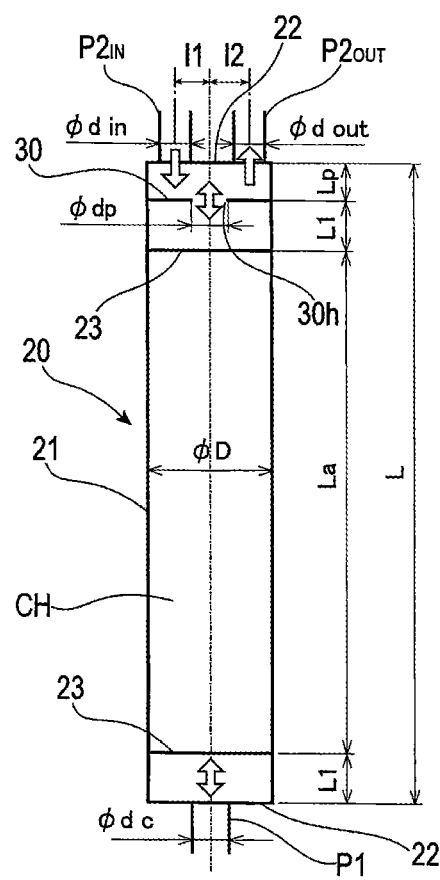
FIG. 2 is a schematic cross-sectional view showing the energy recovery chamber of the present invention which is applied to the seawater desalination system shown in FIG. 1.

FIG. 2 is a schematic cross-sectional view showing the energy recovery chamber of the present invention which is applied to the seawater desalination system shown in FIG. 1. As shown in FIG. 2, the energy recovery chamber 20 comprises a long chamber body 21 having a cylindrical shape, and end plates 22 for closing both opening ends of the chamber body 21. A chamber CH is formed in the chamber body 21, and a concentrated seawater port P1 is formed in one of the end plates 22, and a seawater inflow port $P2_{IN}$ and a seawater discharge port $P2_{OUT}$ are formed in the other of the end plates 22. A concentrated seawater port P1 is disposed on the central axis of the cylindrical chamber body 21, but the seawater inflow port $P2_{IN}$ and the seawater discharge port $P2_{OUT}$ are disposed at positions deviated from the central axis of the chamber body 21. Specifically, the seawater port $P2_{IN}$ and the seawater discharge port $P2_{OUT}$ are deviated respectively from the central axis of the chamber body 21 by distances l1, l2. The distances may be l1=l2.

The energy recovery chamber 20 is installed vertically. The chamber CH is disposed vertically in consideration of the effect of a difference in specific gravity between the concentrate seawater and the seawater, and the port P1 for the concentrated seawater having large specific gravity is disposed at a lower part of the chamber CH and the ports $P2_{IN}$, $P2_{OUT}$ for the seawater having small specific gravity are disposed at an upper part of the chamber CH. That is, the long chamber body 21 having a cylindrical shape is installed such that a longitudinal direction (axial direction) of the chamber is placed in a vertical direction. The concentrated seawater port P1 is provided at the lower part of the chamber CH for supplying and discharging the concentrated seawater at the lower part of the chamber CH, and the seawater inflow port $P2_{IN}$ and the seawater discharge port $P2_{OUT}$ are provided at the upper part of the chamber CH for supplying and discharging the seawater at the upper part of the chamber CH. The entire length of the chamber CH is L. In the chamber CH, a flow resistor 23 is disposed at a position spaced by a distance L1 in the axial direction from the concentrated seawater port P1.

Further, in the chamber CH, a holed circular plate 30 is disposed at a position spaced by a distance Lp in the axial direction from the seawater ports $P2_{IN}$ and $P2_{OUT}$. The holed circular plate 30 has an outer diameter equal to an inner diameter ($\phi D$) of the chamber and has a circular hole $30h$ having a diameter ($\phi dp$) at a central part thereof. Further, in the chamber CH, a flow resistor 23 is disposed at a position spaced by a distance L1 in the axial direction from the holed circular plate 30. The flow resistor 23 comprises a single perforated plate.

Figure 18:
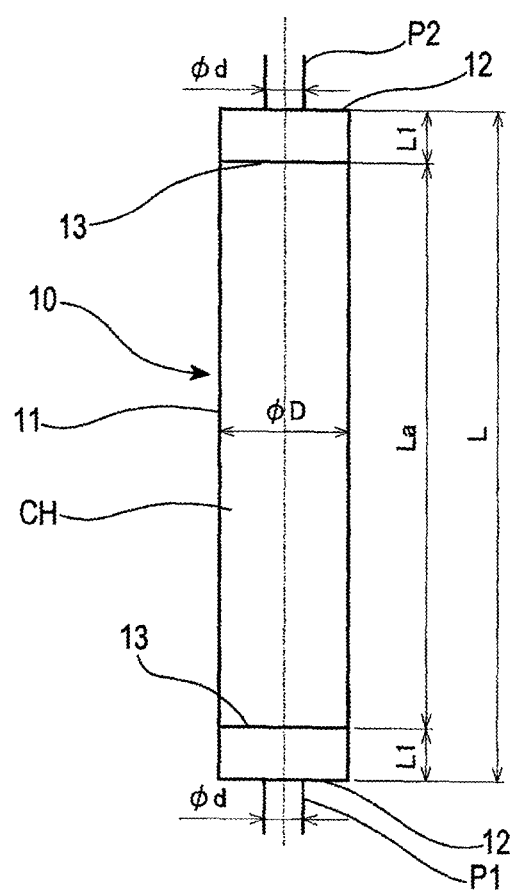
FIG. 18 is a cross-sectional view showing an energy recovery chamber having no piston.
Figure 19:
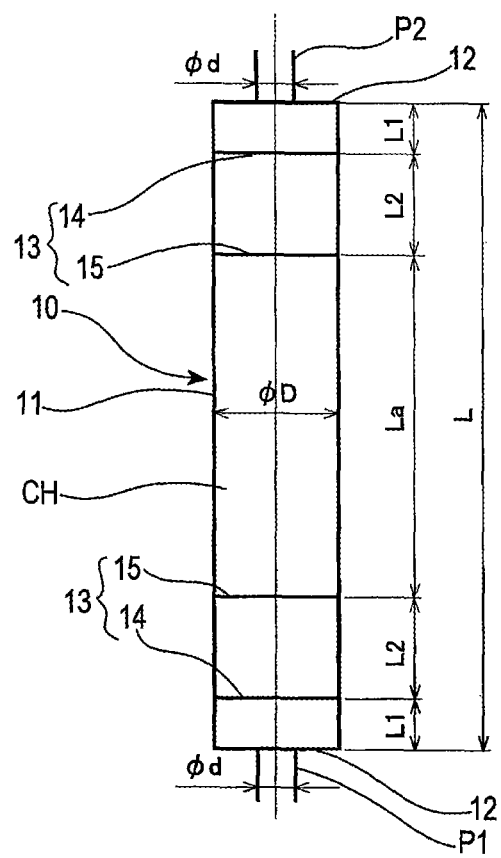
FIG. 19 is a cross-sectional view showing the energy recovery chamber in which two perforated plates spaced by a predetermined distance are disposed near the respective ports as a flow resistor in FIG. 18.
Figure 20:
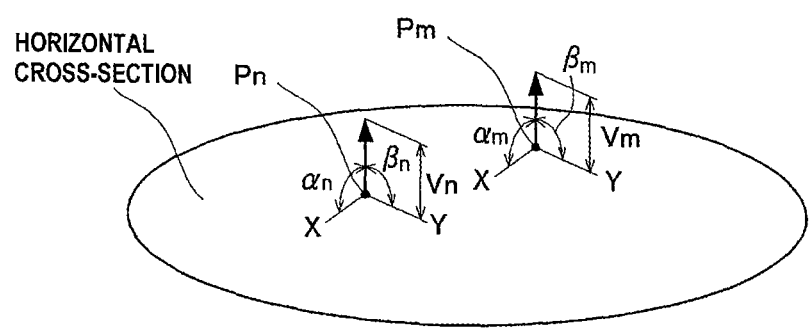
FIG. 20 is a view showing the uniformity of flows at any points Pn, Pm in the horizontal cross-section in the chamber.
Figure 21:
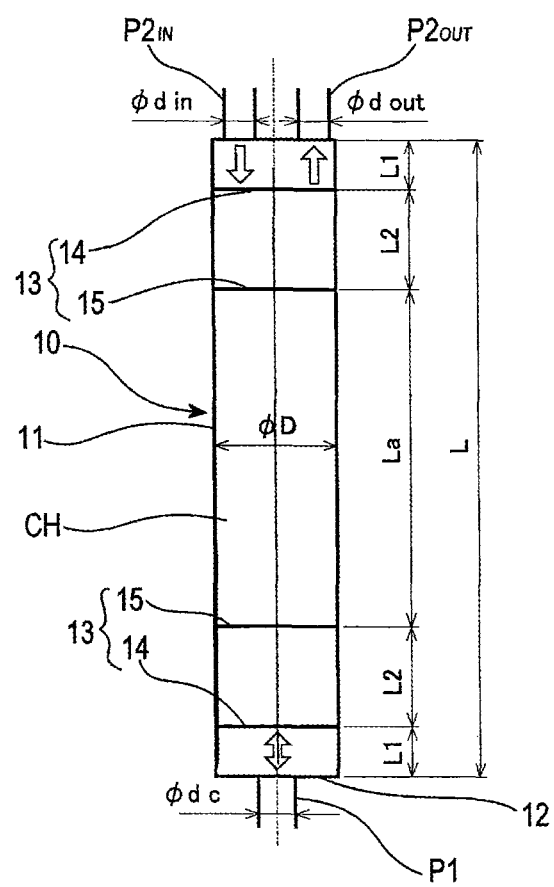
FIG. 21 is a cross-sectional view showing the energy recovery chamber in which the seawater port is divided into a seawater inflow port and a seawater discharge port which are arranged at positions spaced radially from the center of the chamber.
Figure 22:
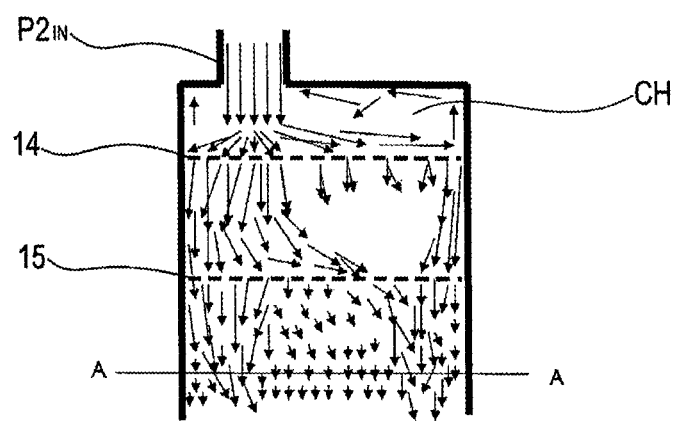
FIG. 22 is a view showing the results of flow analysis in the case where the seawater port is arranged at a position spaced in a radial direction from the chamber axis and the seawater flows into the chamber from the seawater inflow port $P2_{IN}$.

By the holed circular plate 30, the fluid which has flowed into the chamber CH from the seawater inflow port $P2_{IN}$ flows towards the flow resistor 23 from the central hole $30h$ of the holed circular plate 30, and thus this flow of fluid becomes substantially the same flow as that at the seawater-side port shown in FIG. 18 where the seawater port P2 is disposed on the chamber axis and the fluid flows vertically downward, and the same action and effect can be obtained.

Figure 3:
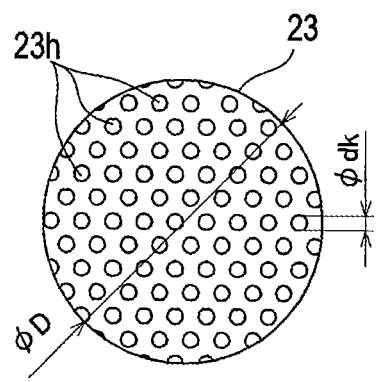
FIG. 3 is a plan view showing an example of the flow resistor, and a plan view showing the flow resistor comprising a single perforated plate.

FIG. 3 is a view showing an example of the flow resistor, and a plan view showing the flow resistor 23 comprising a single perforated plate. As shown in FIG. 3, the flow resistor 23 comprises a perforated plate which is a circular plate having an outer diameter (φD) equal to the inner diameter of the chamber and having a plurality of small holes 23h with a diameter (φdk). The holes 23h having a small diameter are formed at regular intervals over the entire circular plate. The flow resistor 23 comprising the perforated plate has a function for regulating the flow of fluid so that the flow of fluid at the downstream side of the circular plate is uniformized over the entirety of the chamber by applying suitable flow resistance to the flow of fluid at the upstream side of the circular plate in the chamber CH.

Figure 4:
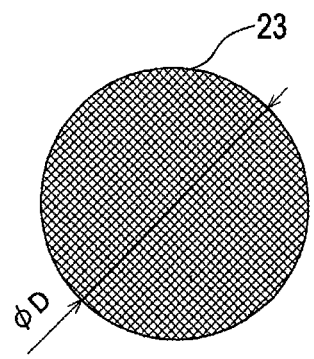
FIG. 4 is a view showing an example of another flow resistor, and a plan view showing the flow resistor comprising a single mesh plate.

FIG. 4 is a view showing an example of another flow resistor, and a plan view showing the flow resistor comprising a single mesh plate. As shown in FIG. 4, the flow resistor 23 comprises a mesh plate which is formed by weaving a wire material into a circular plate shape. The mesh plate comprises a circular plate having an outer diameter (φD) equal to the inner diameter of the chamber CH. The wire material is made of metal or resin, and a wire diameter and a pitch of woven wire, i.e., coarseness of the mesh is suitably configured. The flow resistor 23 comprising the mesh plate has a function for regulating the flow of fluid so that the flow of fluid at the downstream side of the mesh plate is uniformized over the entirety of the chamber by applying suitable flow resistance to the flow of fluid at the upstream side of the mesh plate, as with the perforated plate.

Other flow resistors may comprise a porous material such as sponge, a block-like material whose thickness is not thin unlike a plate, or other materials which apply desired resistance to the flow of fluid and are designed to obtain the uniformizing action for uniformizing the flow.

Figure 5:
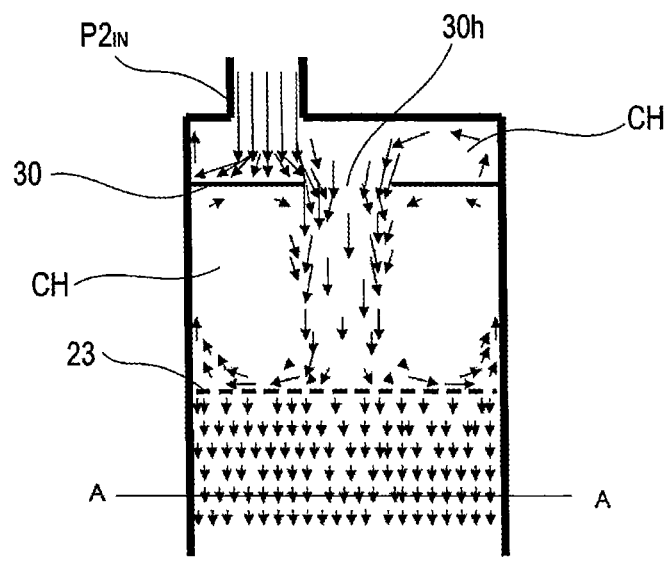
FIG. 5 is a view showing the results of flow analysis in the vicinity of the seawater port in the case where the holed circular plate which has an outer diameter equal to the inner diameter of the chamber and has a hole at the central part thereof is disposed horizontally between the flow resistor and the seawater port as shown in FIG. 2.

FIG. 5 is a view showing the results of flow analysis in the vicinity of the seawater port in the case where the holed circular plate 30 which has an outer diameter equal to the inner diameter (φD) of the chamber and has a hole of φdp at the central part thereof is disposed horizontally between the flow resistor 23 and the seawater ports $P2_{IN}$, $P2_{OUT}$ as shown in FIG. 2. In FIG. 5, the seawater discharge port $P2_{OUT}$ is not shown. Arrows in FIG. 5 are as follows: Flow velocity of fluid is shown by a length of arrow and flow direction of fluid is shown by a direction of arrow. The fluid which has flowed into the chamber CH from the seawater inflow port $P2_{IN}$ collides with the outer circumferential portion of the holed circular plate 30 whose hole is blocked, and spreads in the space formed by the seawater inflow port $P2_{IN}$, the holed circular plate 30 and the side wall surface of the chamber, and then flows toward the flow resistor 23 from the central hole 30h of the holed circular plate 30. By providing the holed circular plate 30, the seawater flows toward the central part of the flow resistor 23 comprising a perforated plate or a mesh plate, and the flow resistor 23 effectively achieves its original function for regulating the flow uniformly over the entirety of the chamber. Thus, the magnitude of flow and the direction of flow can be uniformized in the A-A cross-section spaced by a predetermined distance from the flow resistor 23 shown in FIG. 5.

Figure 6:
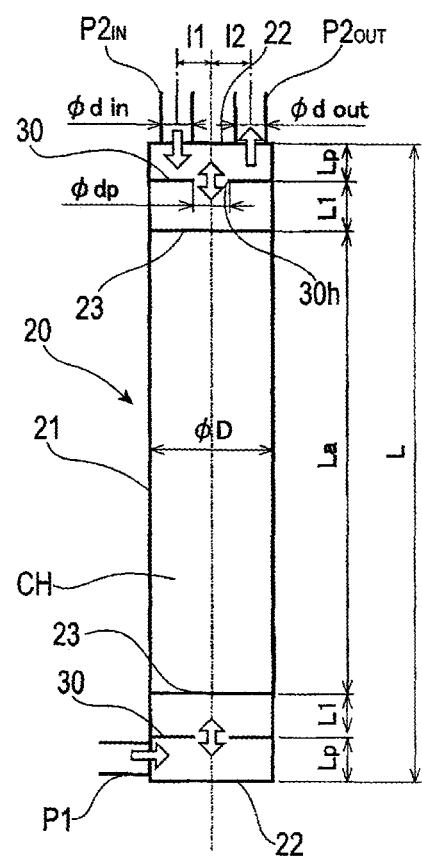
FIG. 6 is a schematic cross-sectional view showing an energy recovery chamber in which the concentrated seawater port shown in FIG. 2 is provided at the side surface of the chamber.

FIG. 6 is a schematic cross-sectional view showing the energy recovery chamber 20 in which the concentrated seawater port P1 shown in FIG. 2 is provided at the side surface of the chamber. A holed circular plate 30 is provided horizontally at a position spaced by a distance Lp from the end plate 22 at the concentrated seawater port side, and a flow resistor 23 is provided at a position spaced by a distance L1 in the axial direction from the holed circular plate 30. The flow resistor 23 comprises a single perforated plate or mesh plate.

In the energy recovery chamber 20 shown in FIG. 6 also, since the fluid which has flowed in from the chamber side surface flows toward the flow resistor 23 from the central part of the chamber by the holed circular plate 30, this flow becomes substantially the same flow as that in the configuration in which the concentrated seawater port is placed on the chamber axis and directed vertically upward as with FIG. 18, and the same action and effect can be obtained.

Figure 7:
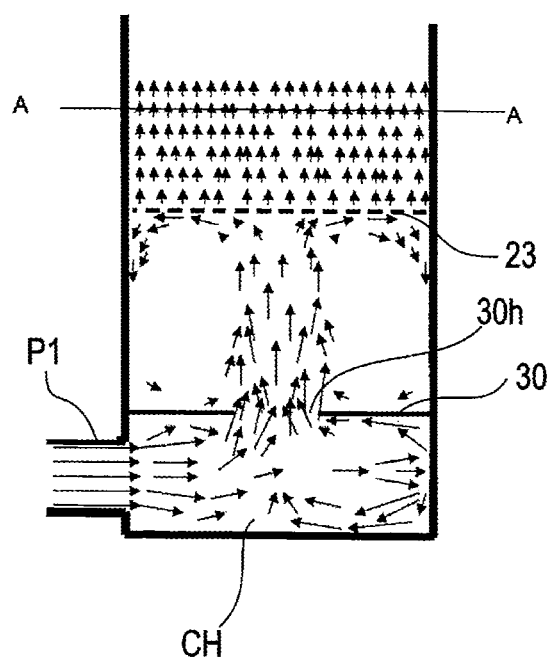
FIG. 7 is a view showing the results of flow analysis in the vicinity of the concentrated seawater port in the case where the concentrated seawater port is provided at the side surface of the chamber as shown in FIG. 6.

FIG. 7 is a view showing the results of flow analysis in the vicinity of the concentrated seawater port in the case where the concentrated seawater port P1 is provided at the side surface of the chamber as shown in FIG. 6. Arrows in FIG. 7 are as follows: Flow velocity of fluid is shown by a length of arrow and flow direction of fluid is shown by a direction of arrow. As shown in FIG. 7, the fluid which has flowed into the chamber CH from the concentrated seawater port P1 spreads in the space formed by the concentrated seawater port P1, the holed circular plate 30 and the side wall surface of the chamber. In this space, a complicated flow is formed, but the fluid passes through the central hole 30h of the holed circular plate 30 from the above space and flows toward the flow resistor 23. By providing the holed circular plate 30, the concentrated seawater flows toward the center of the flow resistor 23, and thus the flow resistor 23 effectively achieves its original function for regulating the flow uniformly over the entirety of the chamber. Accordingly, the magnitude of flow and the direction of flow can be uniformized in the A-A cross-section spaced by a predetermined distance from the flow resistor 23 shown in FIG. 7.

Figure 8:
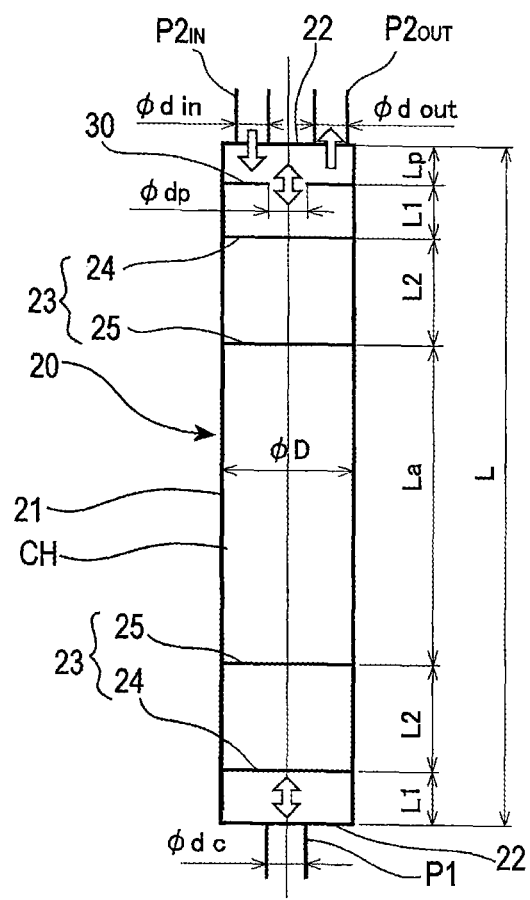
FIG. 8 is a schematic cross-sectional view showing an energy recovery chamber of the energy recovery apparatus according to still another embodiment of the present invention.

FIG. 8 is a schematic cross-sectional view showing an energy recovery chamber of the energy recovery apparatus according to still another embodiment of the present invention. As shown in FIG. 8, at the upper part of the energy recovery chamber 20, a seawater inflow port $P2_{IN}$ and a seawater discharge port $P2_{OUT}$ are arranged at positions spaced radially from the chamber axis, and the seawater inflow port $P2_{IN}$ is configured to allow the seawater to flow in vertically downward and the seawater discharge port $P2_{OUT}$ is configured to allow the seawater to flow out vertically upward. At the lower part of the chamber, the concentrated seawater port P1 is placed on the chamber axis and arranged vertically upward, and thus the concentrated seawater flows into and out of the chamber in the vertical direction.

A holed circular plate 30 is provided horizontally at a position spaced by a distance Lp from the seawater port side, and a first perforated plate 24 is provided at a position spaced by a distance L1 from the holed circular plate 30. Further, a second perforated plate 25 is provided at a position spaced by a distance L2 in the axial direction from the first perforated plate 24. The first perforated plate 24 and the second perforated plate 25 constitute a flow resistor 23.

At the concentrated seawater port side, a concentrated seawater port P1 is disposed at the center of the chamber to allow the concentrated seawater to be supplied and discharged vertically upward. A first perforated plate 24 is disposed at a position spaced by a distance L1 from the concentrated seawater port P1, and a second perforated plate 25 is disposed at a position spaced by a distance L2 from the first perforated plate 24. In the present embodiment, the flow-regulating structure which is configured by the flow resistor 23 comprising a single perforated plate in FIG. 2 is changed to the flow-regulating structure which is configured by the flow resistor 23 comprising two perforated plates of the first perforated plate 24 and the second perforated plate 25. By selecting the arrangement positions of the first perforated plate 24 and the second perforated plate 25 from the ports and the respective aperture ratios suitably, the uniformizing action for uniformizing the flow can be enhanced.

Figure 9:
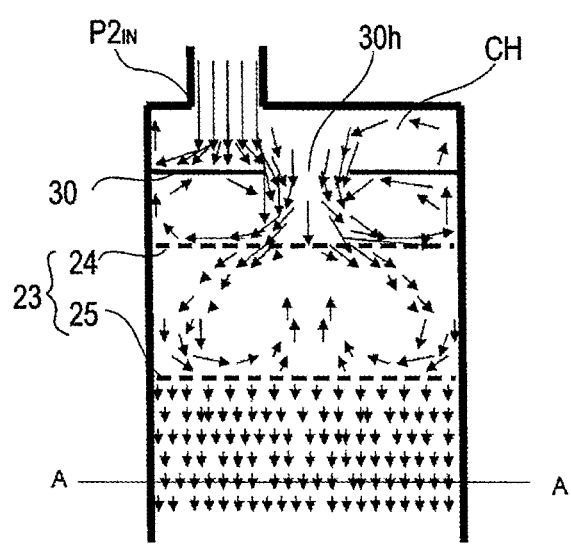
FIG. 9 is a view showing the flow analysis in the vicinity of the seawater port in the energy recovery chamber having the configuration shown in FIG. 8.

FIG. 9 is a view showing the flow analysis in the vicinity of the seawater port in the energy recovery chamber 20 having the configuration shown in FIG. 8. In FIG. 9, the seawater discharge port $P2_{OUT}$ is not shown. Arrows in FIG. 9 are as follows: Flow velocity of fluid is shown by a length of arrow and flow direction of fluid is shown by a direction of arrow. As shown in FIG. 9, the fluid which has flowed into the chamber CH from the seawater inflow port $P2_{IN}$ disposed at a position spaced radially from the chamber axis collides with the outer circumferential portion of the holed circular plate 30 whose hole is blocked, and spreads in the space formed by the seawater inflow port $P2_{IN}$, the holed circular plate 30 and the side wall surface of the chamber, and then passes through the central hole 30h of the holed circular plate 30 and flows toward the first perforated plate 24. Then, the high-speed fluid at the central part of the chamber is dispersed so as to spread across the outer circumference of the chamber by the first perforated plate 24, and the fluid flows further by the interval L2, and is then dispersed and regulated by the second perforated plate 25 so that a uniform flow is formed in the cross-section of the chamber.

In this manner, also in the case of the flow resistor 23 in which two perforated plates are arranged, by providing the holed circular plate 30 in the same manner, an original function for regulating the flow uniformly over the entirety of the chamber is performed effectively. Therefore, the magnitude of flow and the direction of flow can be uniformized in the A-A cross-section spaced by a predetermined distance from the second perforated plate 25 shown in FIG. 9. By providing the two perforated plates, the arrangement positions of the first perforated plate 24 and the second perforated plate 25, the diameter of the small hole, the distance of the small holes (pitch), and the aperture ratios can be adjusted. Therefore, the degree of freedom for adjusting the uniformizing action of the flow can be increased and the uniformizing action can be enhanced.

In the case where the two perforated plates are arranged, by the combination of the first perforated plate 24 and the second perforated plate 25, the arrangement positions of the respective perforated plates, the diameter of the small hole, the distance of the small holes (pitch), and the aperture ratios can be optimized. In some cases, a uniformizing effect of flow at the downstream side of the first perforated plate 24 is lessened only by the first perforated plate 24, but by the first perforated plate 24 and the second perforated plate 25, while the fluid flows by the distance L2 between the first perforated plate 24 and the second perforated plate 25, the uniformizing effect of flow at the downstream side of the second perforated plate 25 is optimized so as to be enhanced.

Figure 10:
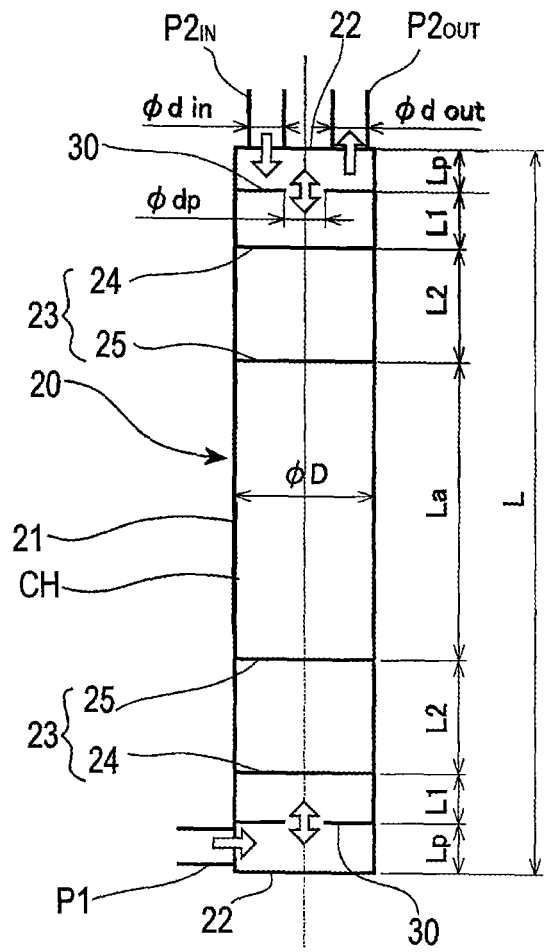
FIG. 10 is a schematic cross-sectional view showing an energy recovery chamber of the energy recovery apparatus according to still another embodiment of the present invention.

FIG. 10 is a schematic cross-sectional view of an energy recovery chamber in the energy recovery apparatus according to still another embodiment of the present invention. In the present embodiment, the configuration of the seawater port side at the upper part of the chamber is the same as that in FIG. 8, and the concentrated seawater port P1 at the lower part of the chamber is disposed at the side surface of the chamber. Further, a holed circular plate 30 is provided horizontally at a position spaced by a distance Lp from the end plate 22 at the concentrated seawater port side, and a first perforated plate 24 is provided at a position spaced by a distance L1 from the holed circular plate 30. Further, a second perforated plate 25 is provided at a position spaced by a distance L2 from the first perforated plate 24. By providing the holed circular plate 30 at the upstream side of the first perforated plate 24 at the concentrated seawater port side, the concentrated seawater flows from the center of the chamber to the first perforated plate 24, and thus the same action and effect as those in the configuration in which the concentrated seawater port is disposed at the center of the chamber can be obtained. In the present embodiment, the flow-regulating structure which is configured by the flow resistor 23 comprising a single perforated plate or mesh plate in FIG. 6 is changed to the flow-regulating structure which is configured by the flow resistor 23 comprising two perforated plates of the first perforated plate 24 and the second perforated plate 25. By selecting the arrangement positions of the first perforated plate 24 and the second perforated plate 25 from the port and the respective aperture ratios suitably, the uniformizing action of the flow can be enhanced. It goes without saying that the first perforated plate 24 and the second perforated plate 25 may be replaced with mesh plates.

FIGS. 11 through 14 are plan views showing modified examples, which can obtain the action and effect of the present invention, of the holed circular plates 30 provided between each port and the flow resistor 23 and having a hole at the central part thereof.

Figure 11:
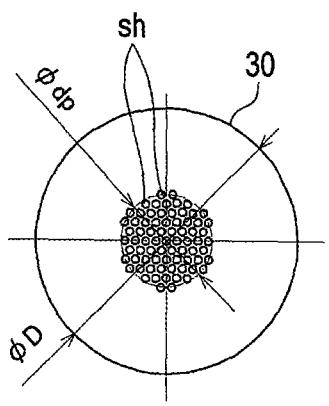
FIG. 11 is a view showing a modified example of a holed circular plate which is provided between each port and the flow resistor and has a hole at the central part thereof.

FIG. 11 shows a holed circular plate 30 which has a plurality of small holes sh formed inside a circle of a diameter φdp located at the center of the circular plate with an outer diameter φD. By this circular plate, the flow of fluid which is directed to the central direction of the flow resistor 23 from the circular plate in the chamber can be formed.

Figure 12:
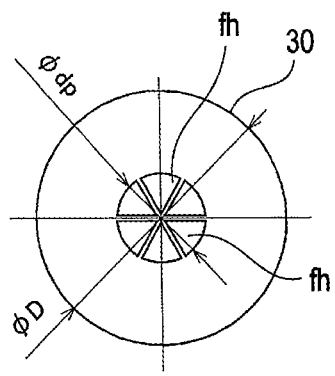
FIG. 12 is a view showing a modified example of a holed circular plate which is provided between each port and the flow resistor and has a hole at the central part thereof.

FIG. 12 shows a holed circular plate 30 having a circle of a diameter φdp, which is divided into a plurality of fan-shaped holes fh, located at the center of the circular plate with an outer diameter φD. By this circular plate, the flow of fluid which is directed to the central direction of the flow resistor 23 from the circular plate in the chamber can be formed.

In the holed circular plate 30 shown in FIGS. 11 and 12, since a plate material remaining between the small holes serves as a support plate to enhance the strength of the entire plate, this structure is effective for the case where a large force is applied to the circular plate by a jet flow from the port.

Figure 13:
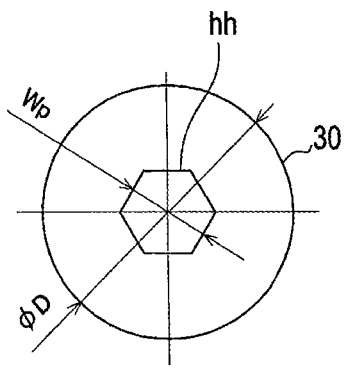
FIG. 13 is a view showing a modified example of a holed circular plate which is provided between each port and the flow resistor and has a hole at the central part thereof.

FIG. 13 shows a holed circular plate 30 which has a regular hexagonal hole hh whose width across flats is Wp at the center of the circular plate having an outer diameter φD. By this circular plate, the flow of fluid which is directed to the central part of the flow resistor 23 from the circular plate in the chamber can be formed.

Figure 14:
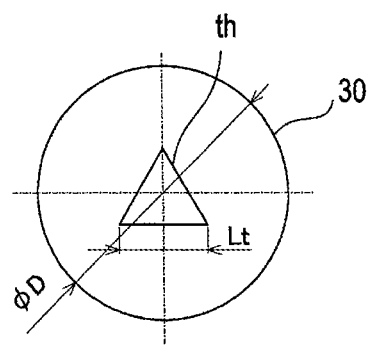
FIG. 14 is a view showing a modified example of a holed circular plate which is provided between each port and the flow resistor and has a hole at the central part thereof.

FIG. 14 shows a holed circular plate 30 which has an equilateral-triangular hole th whose side is Lt at the center of the circular plate having an outer diameter φD. By this circular plate, the flow of fluid which is directed to the central part of the flow resistor 23 from the circular plate in the chamber can be formed.

As shown in FIGS. 13 and 14, by forming the regular polygonal hole, the circular plate can form a flow of fluid directed to the central part of the flow resistor 23.

Figure 15:
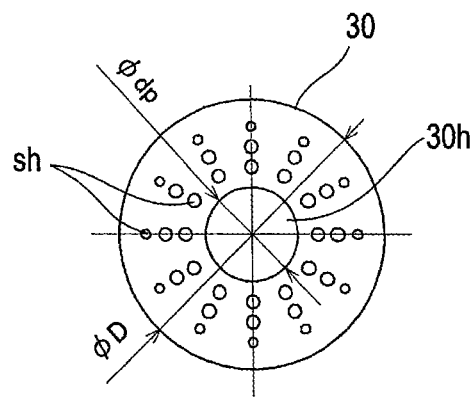
FIG. 15 is a view showing a holed circular plate, additionally having a circular hole at the central part of the circular plate, having small holes arranged radially at the outer circumferential side of the hole.
Figure 16:
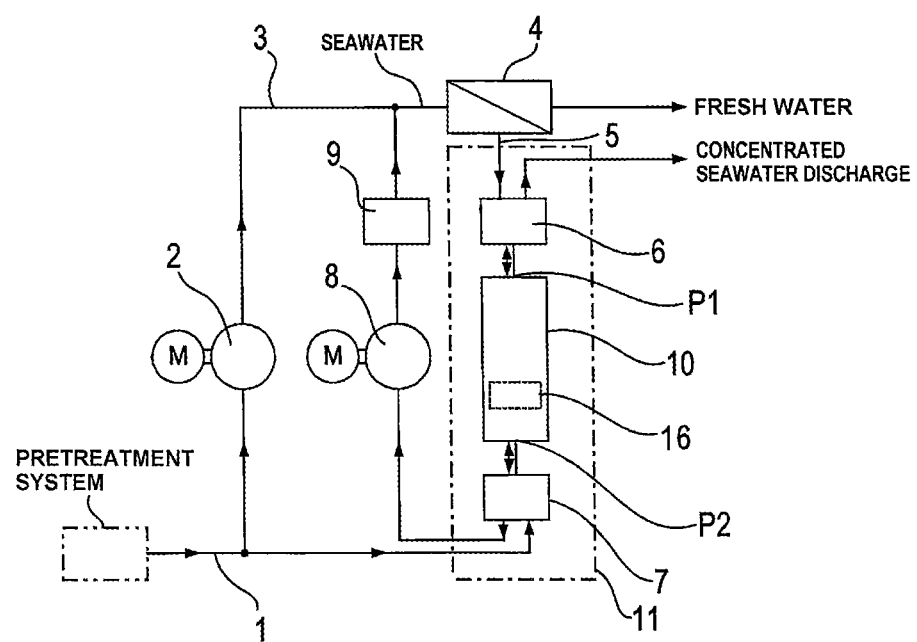
FIG. 16 is a schematic view showing a configuration example of a conventional seawater desalination system.
Figure 17:
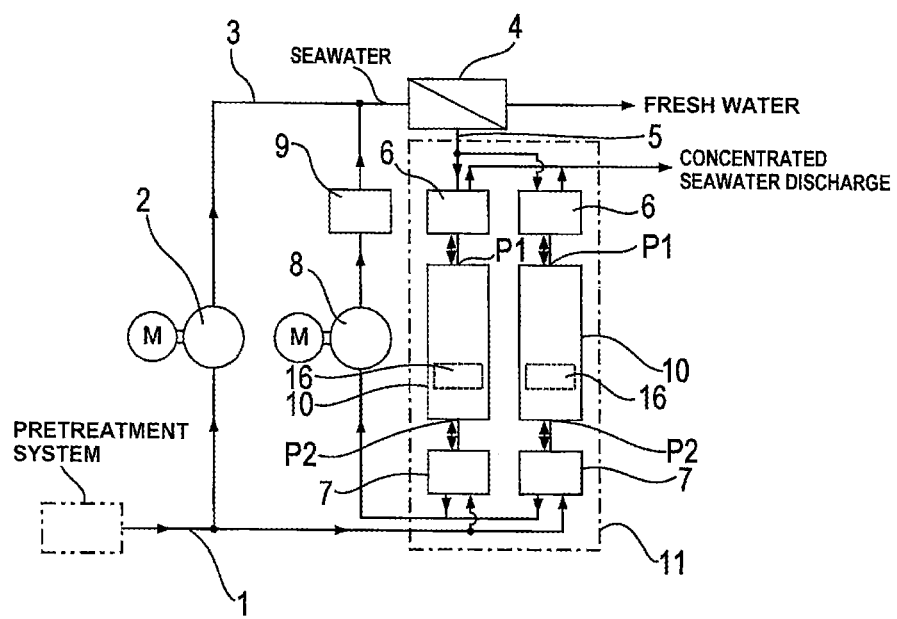
FIG. 17 is a schematic view showing a configuration example of the conventional seawater desalination system comprising the two control valves, the two energy recovery chambers and the two valves which are the components of the energy recovery apparatus shown in FIG. 16.

In FIG. 15, in addition to having a circular hole 30h of a diameter φdp at the central part of the circular plate having an outer diameter φD, the holed circular plate 30 has small holes sh arranged radially at the outer circumferential side of the hole 30h. By this circular plate also, the flow of fluid which is directed to the central direction of the flow resistor 23 from the circular plate in the chamber can be formed. By the small holes sh provided at the circumferential portion of the circular plate, while the fluid which passes through the circular plate flows through the central hole 30h substantially, a trickle of fluid through the outer circumferential side also can be formed, and thus the flow of fluid to the flow resistor 23 can be further uniformized. Further, by providing the small-diameter holes sh at the outer circumferential portion of the circular plate, a force applied to the circular plate by a pressure difference between upstream and downstream of the circular plate can be small, and thus deformation of the plate caused by the flow can be lessened. Whether the uniformizing action of flow is enhanced or not by providing the small holes sh at the outer circumferential portion of the circular plate depends on the arrangement of the port provided in the chamber, and thus it is preferable to implement such measures after ascertaining their action and effect by the flow analysis or the like.

As shown in FIGS. 11 through 14, a hole or holes may be provided so as to increase the rate of opening area at the central portion of the holed circular plate 30, and a hole or holes having a low rate of opening area may be provided at the outer circumferential portion of the holed circular plate 30.

It is desirable that the shape of hole at the center of the holed circular plate 30 is an axially-symmetric shape with respect to a central vertical axis, i.e., an axis of a longitudinal direction of the chamber. Further, it is desirable that the central hole of the holed circular plate 30 has an hole area equal to or larger than the cross-sectional area of the concentrated seawater port or the seawater port. By setting such area, it is possible to make the flow velocity of fluid passing through the central hole of the circular plate smaller than the flow velocity of fluid flowing in from the port.

In the case where the seawater port is spaced radially from the chamber axis and is divided into a seawater inflow port $P2_{IN}$ and a seawater discharge port $P2_{OUT}$, the area of the seawater inflow port $P2_{IN}$ (port diameter $d_{in}$) is equal to $(d_{in})^2 \times \pi/4$, and thus the area of the central hole of the holed circular plate 30 at the seawater port side is made to be equal to or larger than the area of the seawater inflow port $P2_{IN}$. In the case where the concentrated seawater port P1 is provided at the side surface of the chamber, the area of the concentrated seawater port P1 (port diameter dc) is equal to $(dc)^2 \times \pi/4$, and thus the area of the central hole of the holed circular plate 30 at the concentrated seawater port side is made to be equal to or larger than the area of the concentrated seawater port P1. Further, if the area of the central hole of the holed circular plate is equal to or larger than the smaller area of $(d_{in})^2 \times \pi/4$ and $(dc)^2 \times \pi/4$, the area of the hole of the holed circular plate becomes equal to or larger than the areas of the holes of both ports, and thus the holed circular plates at the seawater port side and the concentrated seawater port side can be the same.

INDUSTRIAL APPLICABILITY

The present invention is applicable to a seawater desalination system for desalinating seawater by removing salinity from the seawater and an energy recovery apparatus which is preferably used in the seawater desalination system.

Reference Signs List

| | |
|---|---|
| 1 | seawater supply line |
| 2 | high-pressure pump |
| 3 | discharge line |
| 4 | reverse-osmosis membrane-separation apparatus |
| 5 | concentrated seawater line |
| 6 | control valve |
| 7, 9 | valve |
| 8 | booster pump |
| 10, 20 | energy recovery chamber |
| 11, 21 | chamber body |
| 12, 22 | end plate |
| 13, 23 | flow resistor |
| 14, 24 | first perforated plate |
| 15, 25 | second perforated plate |
| 16 | piston |
| 17 | concentrated seawater discharge line |
| 23h, 33h, fh, hh, sh, th | hole |
| 30 | holed circular plate |
| 30h | circular hole |
| CH | chamber |
| P1 | concentrated seawater port |
| P2 | seawater port |
| $P2_{IN}$ | seawater inflow port |
| $P2_{OUT}$ | seawater discharge port |

The invention claimed is:

1. An energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising:

a cylindrical chamber having a space for containing concentrated seawater and seawater therein, the cylindrical chamber being installed such that a longitudinal direction of the cylindrical chamber is placed in a vertical direction;

a concentrated seawater port provided at a lower part of the cylindrical chamber;

a seawater port provided at an upper part of the cylindrical chamber;

a flow resistor provided at a concentrated seawater port side in the cylindrical chamber;

a flow resistor provided at a seawater port side in the cylindrical chamber; and a circular plate having a wall surface and a hole passing through the wall surface at the center thereof that is provided between the concentrated seawater port and the flow resistor, or between the seawater port and the flow resistor, wherein at least one of the concentrated seawater port and the seawater port is spaced radially from a central vertical axis of the cylindrical chamber and has an opening parallel to the wall surface of the circular plate, without facing the hole of the circular plate, wherein the flow resistors provided at the concentrated seawater port side and the seawater port side each comprise at least one perforated plate or at least one mesh plate, the at least one mesh plate being formed by weaving a wire material, and wherein the area of the hole of the circular plate having the hole at the center thereof is equal to or larger than one of the area of the concentrated seawater port and the area of the seawater port.

2. The energy recovery apparatus according to claim 1, wherein the flow resistors provided at each of the concentrated seawater port side and the seawater port side are two perforated plates or mesh plates disposed so as to be spaced from each other, and comprise a first perforated plate or a first mesh plate and a second perforated plate or a second mesh plate which is placed more distant from the respective port side than the first perforated plate or the first mesh plate.

3. The energy recovery apparatus according to claim 1, wherein the circular plate has a plurality of holes around the hole at the center thereof.

4. The energy recovery apparatus according to claim 1, wherein at least one of the concentrated seawater port and the seawater port is provided in an end plate for closing an opening end of the cylindrical chamber.

5. The energy recovery apparatus according to claim 1, wherein at least one of the concentrated seawater port and the seawater port comprises a port for water supply and a port for water discharge.

6. The energy recovery apparatus according to claim 1, wherein at least one of the concentrated seawater port and the seawater port is vertically aligned and spaced radially from the central vertical axis of the cylindrical chamber such that concentrated seawater or seawater flowing vertically therefrom into the cylindrical chamber is obstructed by the wall surface of the circular plate and redirected transverse to the vertical direction.

7. The energy recovery apparatus according to claim 1, wherein at least one of the concentrated seawater port and the seawater port is vertically aligned and spaced radially from the central vertical axis of the cylindrical chamber such that concentrated seawater or seawater flowing vertically therefrom into the cylindrical chamber cannot flow vertically past the circular plate without redirection.

8. A seawater desalination system for producing fresh water from seawater by supplying the seawater pressurized by a pump to a reverse-osmosis membrane-separation apparatus to separate the seawater into fresh water and concentrated seawater, the seawater desalination system comprising:

an energy recovery apparatus according to claim 1 for converting pressure energy of the concentrated seawater discharged from the reverse-osmosis membrane-separation apparatus to pressure energy of the seawater.

* * * * *